May 5, 1925.

P. F. VOKAL ET AL

PROCESS OF MAKING MILLING CUTTERS

Filed May 24, 1921

1,536,736

Inventor
Paul F. Vokal
and A. W. Erdman
By Wayne B. Wells
Attorney.

Patented May 5, 1925.

1,536,736

UNITED STATES PATENT OFFICE.

PAUL F. VOKAL AND ALBERT W. ERDMAN, OF HARTFORD, CONNECTICUT, ASSIGNORS TO PRATT & WHITNEY COMPANY, OF NEW YORK, N. Y., A CORPORATION OF NEW JERSEY.

PROCESS OF MAKING MILLING CUTTERS.

Application filed May 24, 1921. Serial No. 472,029.

*To all whom it may concern:*

Be it known that we, PAUL F. VOKAL and ALBERT W. ERDMAN, citizens of the United States, and residents of Hartford, in the county of Hartford and State of Connecticut, have invented certain new and useful Improvements in Processes of Making Milling Cutters, of which the following is a specification.

Our invention relates to process of forming milling cutters and particularly to process of forming milling cutters having helically arranged teeth.

One object of our invention is to provide a simple and efficient method of operating rotating tools to form a milling cutter that shall have teeth that are so relieved along predetermined lines as to permit the grinding of the teeth along the front cutting faces without changing the form of the article cut by the cutter.

Another object of our invention is to provide a method of the above indicated character that shall consist in simultaneously forming flutes and relieved teeth on a blank by means of a formed milling cutter which is rotated in engagement with the blank which is fed axially, in grinding the relieved surfaces of the teeth on the cutter blank by means of a concave formed grinding wheel, and in grinding the cutting faces of the teeth in conformity with the form of the teeth.

The milling cutters which are produced by preliminary milling cutters in accordance with the method now practiced are not provided with relieved teeth of such form as to permit the sharpening of the cutters by merely grinding the front cutting faces of the teeth. The customary method of sharpening plain milling cutters is to grind the peripheral faces of the teeth. After repeatedly regrinding the peripheral faces of the teeth the relieved surfaces back of such peripheral faces are reground. Such an operation for sharpening the cutters generally entails two steps and moreover tends to reduce the chip space between the teeth. Moreover, the peripheral faces of the teeth are ground by a grinding wheel which rotates on an axis located parallel or substantially parallel to the axis of the cutter. Such a grinding operation produces a concave face in place of a convex face which is preferred.

In a milling cutter formed in accordance with our invention, the teeth are sharpened by grinding the front cutting faces without altering or changing the relieved or peripheral faces. Thus, the sharpening of the cutter is effected by a simple operation and the chip space between the teeth is increased by such operation. Moreover, the cutters produced in accordance with our method are provided with teeth having convex relieved surfaces which are preferred.

Figure 1:
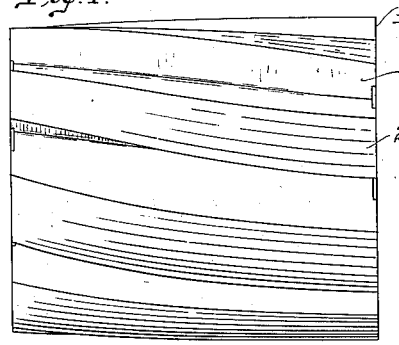
Figure 1 is an elevational view of a milling cutter formed in accordance with our invention.
Figure 2:
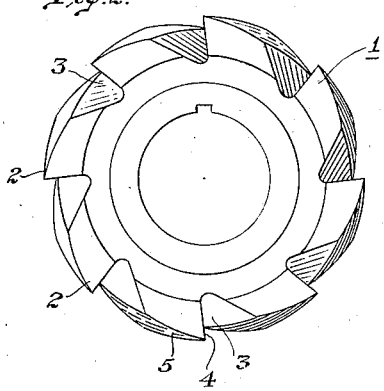
Fig. 2 is an end view of the milling cutter shown in Fig. 1.

Referring to the drawing a milling cutter 1, formed in accordance with our invention, is shown in Figs. 1 and 2 having teeth 2 with helical flutes 3 formed therebetween. The front cutting faces 4 of the teeth are helicoidal surfaces and may be ground for sharpening the cutter. Extending backwardly from the front cutting faces are relieved surfaces 5 which preferably follow a spiral. Although the cutter shown in Figs. 1 and 2 is provided with non-radially arranged cutting faces, it is to be understood that our process is equally applicable for producing a cutter having radially arranged cutting faces. Moreover, the teeth of the cutter may follow the axis thereof instead of being inclined as shown in the illustrated cutter.

Figure 5:
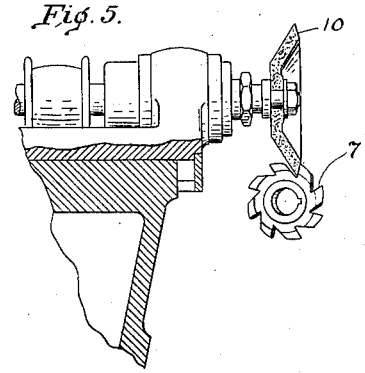
Fig. 5 is a diagrammatic view illustrating the step of grinding the front cutting faces of the teeth.
Figure 4:
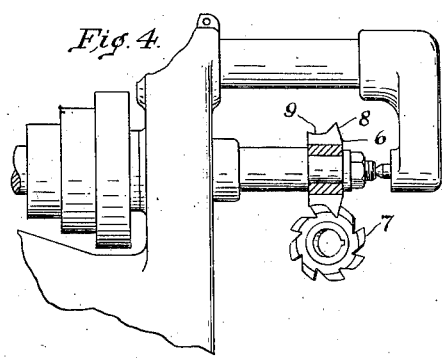
Fig. 4 is a diagrammatic view illustrating the step of forming the teeth with helical flutes therebetween.
Figure 6:
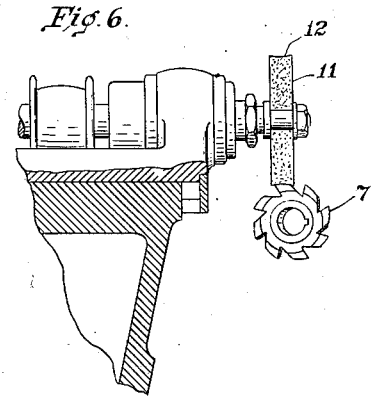
Fig. 6 is a diagrammatic view illustrating the step of grinding the relieved surfaces of the teeth.

Referring to Figs. 4, 5 and 6, the process for forming a milling cutter will be described. The first step of shaping a blank to produce a milling cutter is preferably effected in a universal milling machine. However, other machines are equally applicable for effecting such step. A formed milling cutter 6 is rotated in engagement with a cutter blank 7, the cutter blank being given a movement of rotation corresponding to the inclination of the teeth with respect to the axis. Preferably the cutter blank is moved axially to effect feeding movements between the blank and the cutter. The formed milling cutter 6 is provided with an extended portion 8 on each tooth which cuts the flutes 3 between the formed teeth 2 as shown in Figs. 1 and 2. Adjacent to the projecting portion 8 on the teeth is a concave surface 9 which serves to cut the relief on the teeth of the blank. The shape of the teeth on the cutter 6 may be varied to produce any desired flutes between the teeth and to form any desired relief on the teeth. The axis of the milling cutter, in the customary manner, is maintained perpendicular to the desired helix angle of the teeth and not to a plane through the axis of the blank. Consequently, unless a correction is made to the form of the cutter, the relief lines on the teeth of the blank will be perpendicular to the helix angle which is not desired. The form of the milling cutter is changed somewhat to compensate for any distortion of the relief lines that may be caused by the relative position of the blank and the milling cutter. The term "spiral relief" which is set forth in many of the claims is intended to cover any relieved surface which extends backward from the front cutting face and inward toward the axis of the blank. After the relieved teeth are formed on the cutter blank, it is subjected to a hardening process.

When the blank has been hardened, the front cutting face is ground by a wheel 10 as shown in Fig. 5 of the drawing. Such operation may be formed in a grinding machine such as disclosed in the patent to Friederich Müller, No. 1,338,320, dated April 27th, 1920. The grinding wheel 10 is rotated in engagement with the blank 7. The blank is rotated in accordance with the inclination of the teeth relative to the axis and is fed axially past the wheel 10. The grinding wheel 10 may be set to grind the teeth in conformity either to radial or non-radial cutting faces.

The relieved surfaces of the blank are ground by a step which is diagrammatically illustrated in Fig. 6 of the drawing. Such step may be performed by a grinding machine such as disclosed in the Müller patent referred to above. In grinding the relieved surface of the teeth of the blank, the grinding wheel 11 is rotated on an axis perpendicular to the plane of the helix of the cutter teeth. The grinding surface 12 of the wheel 11 is concave in form and is so shaped as to cut any desired relief on the teeth of the blank. The blank 7 is given a movement of rotation in accordance with the inclination of the teeth relative to the axis thereof.

Figure 3:
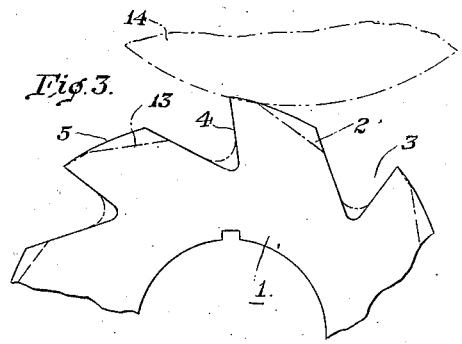
Fig. 3 is a partial end view of the milling cutter shown in Figs. 1 and 2 enlarged and compared with another milling cutter.

Referring to Fig. 3 of the drawing, a milling cutter formed in accordance with our invention is compared with a plain milling cutter formed in accordance with the usual method. A milling cutter 13 formed in accordance with the usual methods is indicated by dotted lines as also is a grinding wheel 14 for grinding the peripheral surfaces of the teeth of such a cutter. As shown in Fig. 3, the teeth of the usual plain milling cutter have their peripheral faces ground by a wheel which rotates on an axis parallel to the axis of the cutter blank. Such an operation produces a concave peripheral surface on each tooth as is indicated in Fig. 3 of the drawing. Moreover, the usual plain milling cutter cannot be sharpened by grinding the front cutting face of each tooth but is sharpened by grinding the peripheral face of each tooth as above indicated. The grinding of the peripheral face of the usual plain milling cutter by a wheel which rotates on an axis parallel to the axis of the blank reduces the chip space between the teeth instead of increasing such space as is desired.

In a milling cutter formed in accordance with our invention, the teeth are uniformly relieved as indicated in Fig. 3 of the drawing and the cutter may be sharpened by grinding the front cutting face 4. The sharpening or grinding of the front cutting face is effected by the step of the process illustrated in Fig. 5 of the drawing. When the teeth are sharpened by grinding the front cutting faces, it will be noted the chip space is increased in place of being decreased as in the case of a milling cutter formed in accordance with the usual methods.

Modifications in the process and in the various steps may be made within the spirit and scope of our invention and such modifications are intended to be covered by the appended claims.

What we claim is:

1. The process of forming a milling cutter which consists in cutting teeth and spirally relieving the surfaces thereof in a cylindrical blank by means of a formed milling cutter, in grinding the relieved surfaces of the teeth by a formed grinding wheel which is so shaped as to maintain the spirally relieved surfaces, and in sharpening the teeth by grinding the front cutting faces.

2. The process of forming a milling cutter which consists in cutting helical teeth spirally relieving the surfaces thereof in a cylindrical blank by means of a formed milling cutter, in grinding the relieved surfaces of the helical teeth by a formed grinding wheel which is so shaped as to maintain the spiral relief on the teeth, and in sharpening the teeth by grinding the front cutting faces.

3. The process of forming a milling cutter which consists in effecting feeding movement between a formed milling cutter and a blank not only to cut the flutes between the teeth but also to effect spiral relief on the teeth by one cutter, and in grinding the relieved surfaces and the front cutting faces of the teeth.

4. The process of forming a milling cutter having helically inclined teeth which consists in rotating a blank in accordance with the desired angle of the helix while effecting feeding movement between a formed milling cutter and the blank not only to cut helical flutes but also to effect relief on the teeth formed between the flutes, and in grinding the relieved surfaces and the front cutting faces of the teeth.

5. The process of forming a milling cutter having helical flutes which consists in rotating a blank in conformity to the desired helical angle of the flutes, in rotating a formed milling cutter in engagement with the blank, in effecting feeding movement between the formed milling cutter and the blank to form helical flutes and teeth having spirally relieved surfaces, in hardening and tempering the blank, in grinding the relieved surfaces of the teeth by a formed grinding wheel having a concave grinding surface so constructed as to maintain the spiral relief on the teeth, and in grinding the front cutting face of the teeth in accordance with the spiral form of the teeth.

6. The process of forming a milling cutter having helically arranged undercut teeth which consists in rotating a blank in accordance with the desired helical angle of the teeth, in rotating a cutting tool in engagement with the blank, in effecting feeding movement between the tool and the blank in conformity to the desired helix angle to cut undercut helical teeth and to spirally relieve the teeth, the relief lines comprising said surfaces lying in planes perpendicular to the axis of the blank, in grinding the relieved surfaces of the teeth by a grinding wheel having a formed concave grinding surface, said blank being moved along the wheel in conformity to the helix angle of the teeth, and in grinding the front cutting faces of the teeth in accordance with the helical inclination of the teeth.

In testimony whereof, we hereto affix our signatures.

PAUL F. VOKAL.
ALBERT W. ERDMAN.